(12) United States Patent
Chun et al.

(10) Patent No.: US 9,565,007 B2
(45) Date of Patent: Feb. 7, 2017

(54) METHOD OF RECEIVING A POINT-TO-MULTIPOINT SERVICE IN A WIRELESS COMMUNICATION SYSTEM

(71) Applicant: LG Electronics Inc., Seoul (KR)

(72) Inventors: Sung-Duck Chun, Anyang (KR); Seung-June Yi, Anyang (KR); Sung-Jun Park, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/955,865

(22) Filed: Dec. 1, 2015

(65) Prior Publication Data
US 2016/0087776 A1  Mar. 24, 2016

Related U.S. Application Data

(63) Continuation of application No. 12/758,547, filed on Apr. 12, 2010, now Pat. No. 9,226,198.
(Continued)

(30) Foreign Application Priority Data

Apr. 8, 2010 (KR) .................. 10-2010-0032444

(51) Int. Cl.
  *H04W 28/18* (2009.01)
  *H04L 5/00* (2006.01)
  *H04W 4/06* (2009.01)
  *H04L 12/18* (2006.01)
  *H04W 72/04* (2009.01)
  *H04W 76/04* (2009.01)

(52) U.S. Cl.
  CPC .............. *H04L 5/0055* (2013.01); *H04L 12/18* (2013.01); *H04W 4/06* (2013.01); *H04W 28/18* (2013.01); *H04W 72/04* (2013.01); *H04W 76/046* (2013.01)

(58) Field of Classification Search
  CPC ............ H04L 12/5875; H04L 1/1621–1/1692; H04W 28/16–28/26; H04W 28/042–28/046; H04W 36/00
  (Continued)

(56) References Cited

U.S. PATENT DOCUMENTS 6,347,234 B1  2/2002  Scherzer
6,891,818 B1 *  5/2005  Jarvisalo et al. ............. 370/337
(Continued)

FOREIGN PATENT DOCUMENTS

CN          1951052 A       4/2007
WO    2005/117317 A1      12/2005

OTHER PUBLICATIONS

LG Electronics; "Discussion on RLC UM for eMBMs" 3GPP TSG-RAN WG2 #66bis; Jun. 29 Jul. 3, 2009; 6.3.3; Los Angeles, USA; R2-093874.
(Continued)

*Primary Examiner* — Andrew Chriss
*Assistant Examiner* — Kenan Cehic
(74) *Attorney, Agent, or Firm* — Dentons US LLP

(57) ABSTRACT

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS) or a Long Term Evolution (LTE) system, and more particularly, to a method of receiving a point-to-multipoint service data, and it may be an object of the present invention is to provide an improved method of receiving the point-to-multipoint service data in a wireless communication system in order to minimize a data loss by a reception entity.

13 Claims, 9 Drawing Sheets

Related U.S. Application Data

(60) Provisional application No. 61/168,921, filed on Apr. 13, 2009, provisional application No. 61/171,440, filed on Apr. 21, 2009, provisional application No. 61/185,173, filed on Jun. 8, 2009.

(58) Field of Classification Search
USPC .................................................. 370/310–350
See application file for complete search history.

(56) References Cited

U.S. PATENT DOCUMENTS

| | | |
|---|---|---|
| 2003/0210669 A1 | 11/2003 | Vayanos et al. |
| 2003/0223385 A1 | 12/2003 | Jiang |
| 2008/0175249 A1 | 7/2008 | Yi et al. |
| 2008/0225765 A1* | 9/2008 | Marinier ............... H04L 1/1841 370/310 |
| 2010/0195519 A1* | 8/2010 | Ji ........................... H04L 1/188 370/252 |
| 2011/0103311 A1 | 5/2011 | Navratil et al. .............. 370/328 |

OTHER PUBLICATIONS

3GPP TS 36.322 V8.5.0; 3rd Generation Partnership Prject; Technical Specification Group Radio Access Network; Evolved Universal Terrestrial Radio Access (E-UTRA) Radio Link Control (RLC) protocol specification (Release 8); 650 Route des Lucioles, Sophia Antipolis, France; Mar. 2009.

Change Request, CATT:, "Correction on UM Receive Operation", 3GPP TSG-RAN2 Meeting #62, R2-082314, May 5-9, 2008.

* cited by examiner

METHOD OF RECEIVING A POINT-TO-MULTIPOINT SERVICE IN A WIRELESS COMMUNICATION SYSTEM

CROSS-REFERENCE

The present application is a Continuation of U.S. application Ser. No. 12/758,547 filed Apr. 12, 2010, which claims priority benefit to the following applications, which contents are all incorporated by reference herein: U.S. Provisional Application No. 61/168,921 (filed on Apr. 13, 2009), 61/171,440 (Apr. 21, 2009), 61/185,173 (Jun. 8, 2009) and Korean Patent Application No. 10-2010-0032444 (Apr. 8, 2010).

BACKGROUND OF THE INVENTION

1. Field of the Invention

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS), a Long Term Evolution (LTE) system or a LTE-A (LTE-Advanced) system, and more particularly, to a method of receiving point-to-multipoint service data without a data loss.

2. Description of the Related Art

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information, to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

Hereinafter, the RLC layer will be explained in more detail. As mentioned above, the RLC layer operates in three modes, TM, UM, and AM. Since the RLC layer performs a simple function in the TM, only the UM and AM will be explained.

The UM RLC generates each Packet Data Unit (PDU) with a PDU header including a Sequence Number (SN), thereby allowing a receiving side to know which PDU has been lost while being transmitted. Accordingly, the UM RLC transmits broadcast/multicast data or transmits real-time packet data such as voice (e.g., VoIP) of a Packet Service domain (PS domain) or streaming on a user plane. Also, on a control plane, the UM RLC transmits, to a specific terminal or specific terminal group in a cell, an RRC message requiring no response for reception acknowledgement.

Similar to the UM RLC, the AM RLC generates each PDU with a PDU header including a Sequence Number (SN). Differently from the UM RLC, in the AM RLC, a receiving side performs acknowledgement for PDUs transmitted from a sending side. In the AM RLC, the reason why the receiving side performs acknowledgement is to request the sending side to retransmit a PDU if the receiving side fails to receive the PDU. The re-transmission function is the main characteristic part of the AM RLC. The AM RLC aims to guarantee error-free data transmission using the re-transmission function. To this end, the AM RLC handles transmission of non-real time packet data such as TCP/IP of PS domain on the user plane, and transmits an RRC message that necessarily requires a reception acknowledgement among RRC message transmitted to a specific terminal in a cell on the control plane.

In terms of directionality, the UM RLC is used for uni-directional communications, while the AM RLC is used for bi-directional communications due to feedback from the receiving side. The UM RLC is different from the AM RLC in the aspect of configuration. The UM RLC and the AM RLC are different in terms of structural aspect: the UM RLC is that a single RLC entity has only one structure of transmission or reception but the AM RLC is that both a sending side and a receiving side exist in a single RLC entity.

The AM RLC is complicated due to its re-transmission function for data. The AM RLC is provided with a retransmission buffer as well as a transmission/reception buffer for retransmission management. The AM RLC performs many functions, e.g., usage of a transmission/reception window for flow control, polling to request a status information (status report) from a receiving side of a peer RLC entity by a sending side, a receiving side's status report informing about its buffer status to a sending side of a peer RLC entity, and generating of a status PDU to transmit status information, or the like. In order to support those functions, the AM RLC requires to have various protocol parameters, status variables, and timers. The PDUs used for controlling data transmission in the AM RLC, such as the status report, a status PDU, or the like, are called Control PDUs, and the PDUs used for transferring user data are called Data PDUs.

In the AM RLC, the RLC Data PDU is further divided into an AMD PDU and an AMD PDU segment. The AMD PDU segment has a portion of data belonging to the AMD PDU. In the LTE system, a maximum size of a data block transmitted by the terminal may vary at each transmission. For instance, having generated and transmitted an AMD PDU having a size of 200 bytes at a certain time period, a sending side AM RLC entity is required to retransmit the AMD PDU since it has received a NACK from a receiving side AM RLC. Here, if a maximum size of a data block which can be actually transmitted is assumed 100 bytes, the AMD PDU cannot be retransmitted in its original form. To solve this problem, the AMD PDU segments are used. The AMD PDU segments refer to the AMD PDU divided into smaller units. During such process, the sending side AM RLC entity divides the AMD DPU into the AMD PDU segments so as to transmit the same over a certain period of time. Then, the receiving side AM RLC entity decodes the AMD PDU from the received AMD PDU segments.

FIG. 4 is an exemplary view illustrating a procedure for a HARQ operation in Acknowledged Mode Radio Link Control (AM RLC).

As shown in the FIG. 4, a HARQ operation is performed in a MAC layer for effective data transmission, and a detail description of the HARQ operation will be given as following.

Firstly, an entity in transmitting side transmits a AMD PDU 1 and a AMD PDU 2 to an entity in receiving side. Alternatively, the transmitting entity may generate a AMD PDU having 200 bytes, and then the transmitting entity may divide the AMD PDU into two AMD PDUs (i.e., AMD PDU 1, AMD PDU 2) each having 100 bytes. Thereafter, the transmitting entity may transmit the AMD PDU 2 to the receiving entity after transmitting the AMD PDU 1 completely.

In the HARQ operation, if the receiving entity receives the AMD PDU 1 successfully from the transmitting entity, the receiving entity may transmit a ACK signal to the transmitting entity. Or, if the receiving entity fails to receive the AMD PDU 1 from the transmitting entity, the receiving entity may transmit a NACK signal to the transmitting entity. In case that the transmitting side receives the NACK signal from the receiving entity, the transmitting side may retransmit the AMD PDU 1 to the receiving side.

SUMMARY OF THE INVENTION

Accordingly, an object of the present invention is to provide an improved method of receiving a point-to-multipoint service data in a wireless communication system in order to minimize a data lose by a receiving entity.

To achieve this and other advantages and in accordance with the purpose of the present invention, as embodied and broadly described herein, there is provided a method for configuring a receiving entity for a reception of a data block, the method comprising: determining whether the receiving entity is configured for a channel related to a point-to-multipoint service; setting a size of receiving window in the receiving entity to zero if it is determined that the receiving entity is configured for the point-to-multipoint service related channel; and processing the data block having sequence number according to the configuration of the receiving entity.

To achieve this and other advantages and in accordance with the purpose of the present invention, as embodied and broadly described herein, there is also provided a terminal for receiving a data block in wireless communication system, the terminal comprising: a transceiver adapted to receive the data block; and a processor adapted to control the transceiver, wherein the processor performs steps of, determining whether a receiving entity is configured for a channel related to a point-to-multipoint service; setting a size of receiving window in the receiving entity to zero if it is determined that the receiving entity is configured for the point-to-multipoint service related channel; and processing the data block having sequence number according to the configuration of the receiving entity.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

Hereinafter, the configuration and operation of preferred embodiments according to the present invention will be described with reference to the accompanying drawings.

Figure 1:
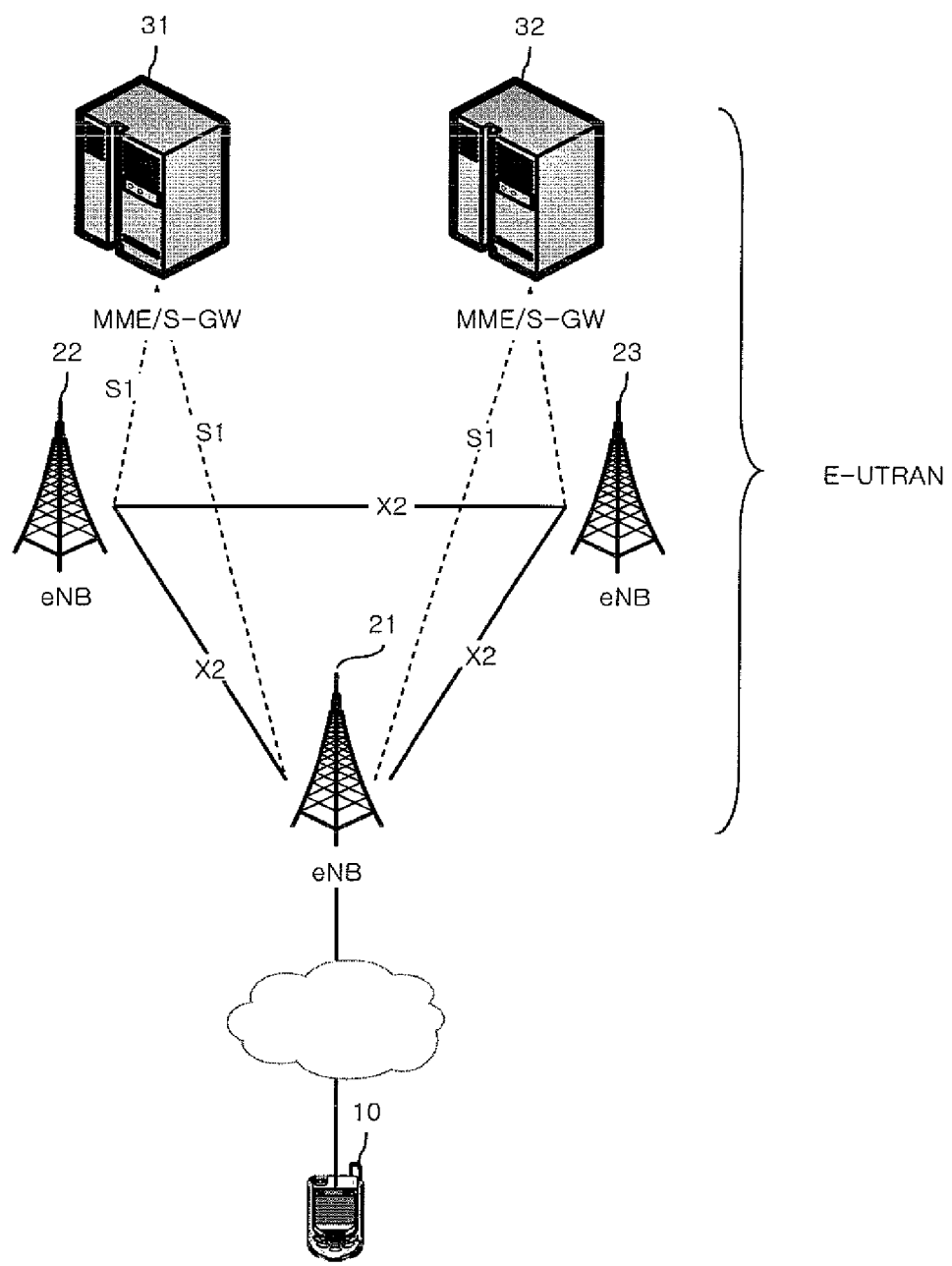
FIG. 1 is a view illustrating a network architecture of E-UTRAN, which is a mobile communication system to which the related art and the present invention are applied.
Figure 2:
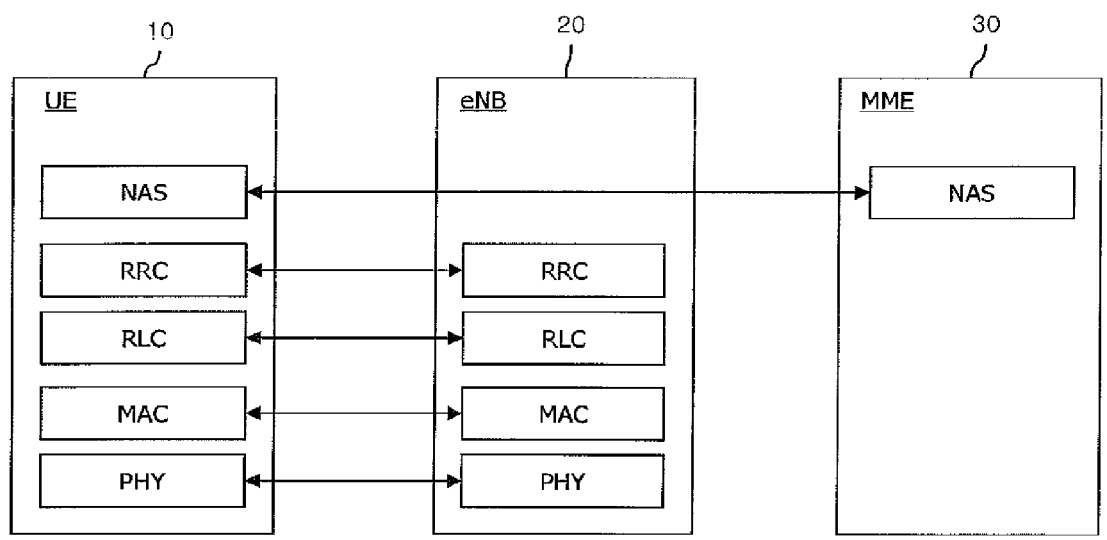
FIG. 2 is an exemplary view illustrating a control plane architecture in a radio interface protocol between UE and E-UTRAN in the related art.
Figure 3:
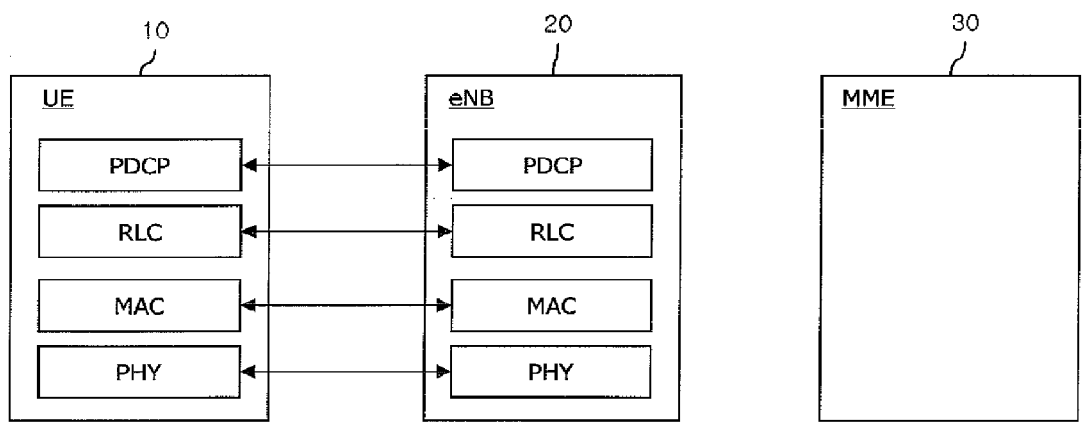
FIG. 3 is an exemplary view illustrating a user plane architecture in a radio interface protocol between UE and E-UTRAN in the related art.
Figure 4:
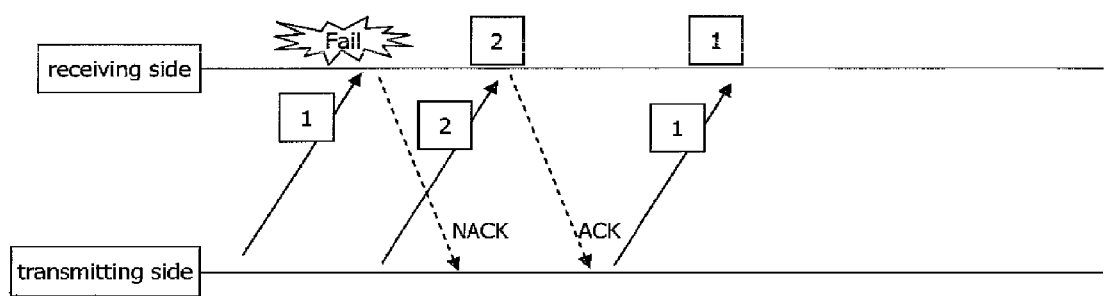
FIG. 4 is an exemplary view illustrating a procedure for a HARQ operation in Acknowledged Mode Radio Link Control (AM RLC)
Figure 5:
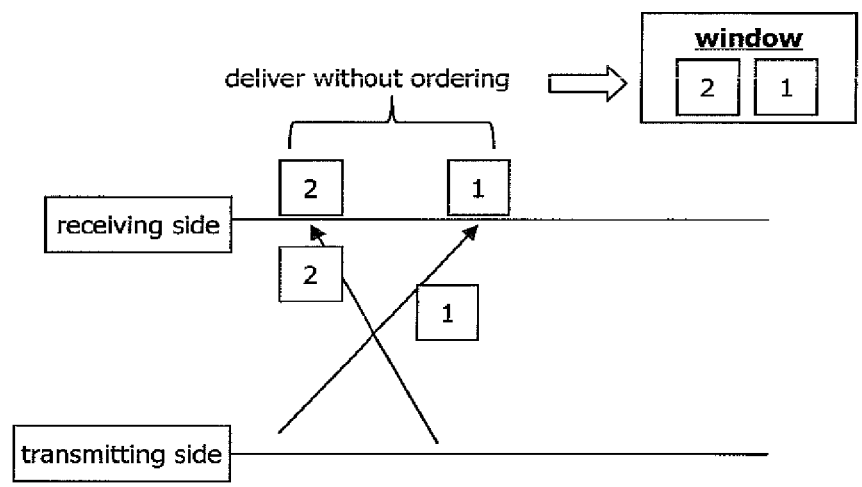
FIG. 5 is an exemplary view illustrating a reordering window operation in Unacknowledged Mode Radio Link Control (UM RLC)

FIG. 5 is an exemplary view illustrating a reordering window operation in Unacknowledged Mode Radio Link Control (UM RLC).

As illustrated in FIG. 5, a transmitting entity transmits a data 2 (e.g., PDU) after transmitting a data 1. However, a receiving entity firstly receives the data 2 before receiving of the data 1. in this case, the receiving entity may operate a reordering window, and the data 1 and data 2 should be reordered when a time for the reordering operation expires.

A more detailed description will be given in below.

First, state variable parameters related with the reordering window is defined as followings;

VT(US): this state variable holds the value of the SN to be assigned for the next newly generated UMD PDU. It is initially set of 0, and is updated whenever the UM RLC entity delivers an UMD PDU with SN=VT(US).

Each receiving UM RLC entity shall maintain the following state variables:

VR(UR)—UM receive state variable
This state variable holds the value of the SN of the earliest UMD PDU that is still considered for reordering. It is initially set to 0.

VR(UX)—UM t-Reordering state variable
This state variable holds the value of the SN following the SN of the UMD PDU which triggered t-Reordering.

VR(UH)—UM highest received state variable
This state variable holds the value of the SN following the SN of the UMD PDU with the highest SN among received UMD PDUs, and it serves as the higher edge of the reordering window. It is initially set to 0.

UM_Window_Size
This constant is used by the receiving UM RLC entity to define SNs of those UMD PDUs that can be received without causing an advancement of the receiving window. UM_Window_Size=16 when a 5 bit SN is configured, UM_Window_Size=512 when a 10 bit SN is configured.

t-Reordering
This timer is used by the receiving side of an AM RLC entity and receiving UM RLC entity in order to detect loss of RLC PDUs at lower layer. If t-Reordering is running, t-Reordering shall not be started additionally, i.e. only one t-Reordering per RLC entity is running at a given time.

A detailed description for receive operations will be given as following. The next is a procedure context for the general receive operation:

The receiving UM RLC entity shall maintain a reordering window according to state variable VR(UH) as follows:
  a SN falls within the reordering window if (VR(UH)—UM_Window_Size)<=SN<VR(UH);
  a SN falls outside of the reordering window otherwise.
When receiving an UMD PDU from lower layer, the receiving UM RLC entity shall:
  either discard the received UMD PDU or place it in the reception buffer;
  if the received UMD PDU was placed in the reception buffer:
    update state variables, reassemble and deliver RLC SDUs to upper layer and start/stop t-Reordering as needed;
When t-Reordering expires, the receiving UM RLC entity shall:
  update state variables, reassemble and deliver RLC SDUs to upper layer and start t-Reordering as needed.

The following is a procedure context for actions when an UMD PDU is received from a lower layer:

When an UMD PDU with SN=x is received from lower layer, the receiving UM RLC entity shall:
  if VR(UR)<x<VR(UH) and the UMD PDU with SN=x has been received before; or
  if (VR(UH)—UM_Window_Size)<=x<VR(UR):
    discard the received UMD PDU;
  else:
    place the received UMD PDU in the reception buffer.

The following is a procedure context for actions when an UMD PDU is placed in the reception buffer:

When an UMD PDU with SN=x is placed in the reception buffer, the receiving UM RLC entity shall:
  if x falls outside of the reordering window:
    update VR(UH) to x+1;
    reassemble RLC SDUs from any UMD PDUs with SN that falls outside of the reordering window, remove RLC headers when doing so and deliver the reassembled RLC SDUs to upper layer in ascending order of the RLC SN if not delivered before;
    if VR(UR) falls outside of the reordering window:
      set VR(UR) to (VR(UH)—UM_Window_Size);
  if the reception buffer contains an UMD PDU with SN=VR(UR):
    update VR(UR) to the SN of the first UMD PDU with SN>current VR(UR) that has not been received;
    reassemble RLC SDUs from any UMD PDUs with SN<updated VR(UR), remove RLC headers when doing so and deliver the reassembled RLC SDUs to upper layer in ascending order of the RLC SN if not delivered before;
  if T_Reordering is running:
    if VR(UX)<=VR(UR); or
    if VR(UX) falls outside of the reordering window and VR(UX) is not equal to VR(UH):
      stop and reset T_Reordering;
      set VR(UX) to NULL;
  if T_Reordering is not running (includes the case when T_Reordering is stopped due to actions above):
    if VR(UH)>VR(UR):
      start T_Reordering;
      set VR(UX) to VR(UH).

The following is a procedure context for actions when actions when T_Reordering expires:

When T_Reordering expires, the receiving UM RLC entity shall:
  update VR(UR) to the SN of the first UMD PDU with SN>=VR(UX) that has not been received;
  reassemble RLC SDUs from any UMD PDUs with SN<updated VR(UR), remove RLC headers when doing so and deliver the reassembled RLC SDUs to upper layer in ascending order of the RLC SN if not delivered before;
  if VR(UH)>VR(UR):
    start T_Reordering;
    set VR(UX) to VR(UH);
  else:
    set VR(UX) to NULL.

For an unicast service, a base station and a terminal have a one-to-one mapping relationship, and the transmitted data from the base station can be only acknowledged or decoded by a corresponding terminal. For a point-to-multipoint service (i.e., Multimedia Broadcast/Multicast Service; MBMS), the base station and terminal have a one to N mapping relationship, and the transmitted data from the base station may be received by a plurality of terminals.

In the point-to-multipoint service (i.e., MBMS), a retransmission of data is not happened. Accordingly, the data transmitted from the base station are sequentially received by a reception entity of the terminal. Namely, if a radio resource parameter(s) are perfectly configured, a setting value of the T-Reordering timer should be 0 ms. Further, values of VR(UH) and VR(UR) should be set with the same value. Therefore, if a sequence number (SN) of a received RLC PDU has a value included in a receiving window, there is a drawback that the received RLC PDU is immediately discarded.

Figure 6:
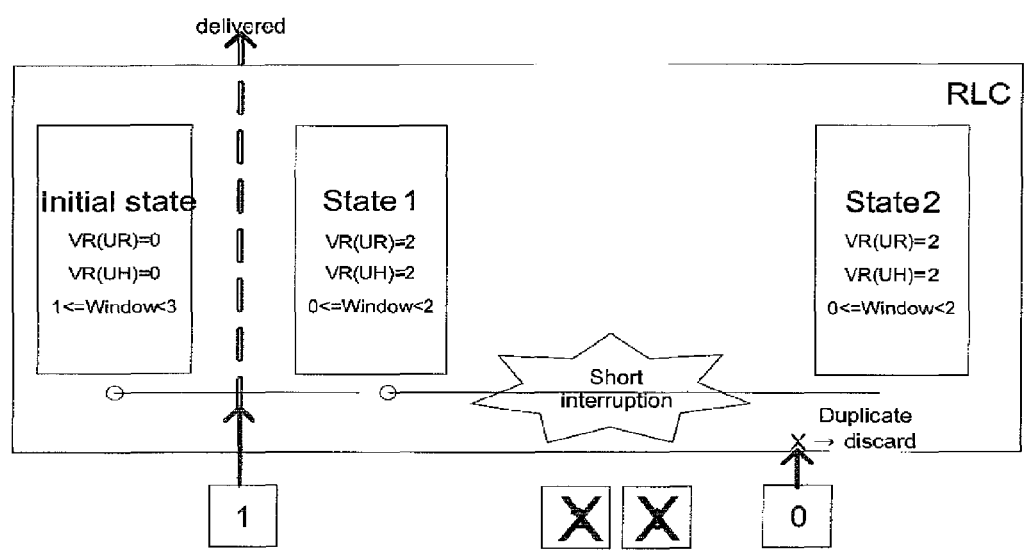
FIG. 6 is an exemplary view illustrating a process of data blocks during a reception of point-to-multipoint service.

FIG. 6 is an exemplary view illustrating a process of data blocks during a reception of point-to-multipoint service.

As illustrated in the FIG. 6, during the reception of point-to-multipoint service, a terminal moves into an out of service area (State 1). While the terminal camps on the out of service area, the transmitted point-to-multipoint service data from a base station can not be possibly received by the terminal. Thereafter, the terminal moves into different area that allows the reception of the point-to-multipoint service data (State 2). However, some of the data received in state 2 is discarded. And, this may cause a drawback, as some of the discarded data in state 2 still can be properly processed.

As shown in the FIG. 6, an initial state of RLC UM entity is set to VR(UR)=VR(UH)=0, and a receiving window is set to 0<=SN<3. If the RLC PDU having SN=1 is received, the state variable of the VR(UR) and VR(UH) are updated to have value of 2. (VR(UR)=VR(UH)=2) The RLC SDUs included in the RLC PDU are processed, and those RLC SDUs are delivered to an upper layer. Then, the receiving window is updated to be set as 0<=SN<2. Thereafter, the terminal goes temporarily through an interruption such as an out of service area. During this time, the terminal misses the RLC PDUs having SN=2,3. Then, the terminal comes out of interruptions (i.e., the out of service area), and the reception of the RLC PDUs becomes possible. Here, the terminal receives the RLC PDU having SN=0. Since the RLC PDU having SN=0 falls into within the receiving window and the SN is less than the VR(UR), the RLC PDU having SN=0 is regarded as a duplicated RLC PDU, and this RLC PDU is discarded. Therefore, there is a possibility that a successfully received RLC PDU can be mistakenly regarded as a duplicated RLC PDU.

Figure 7:
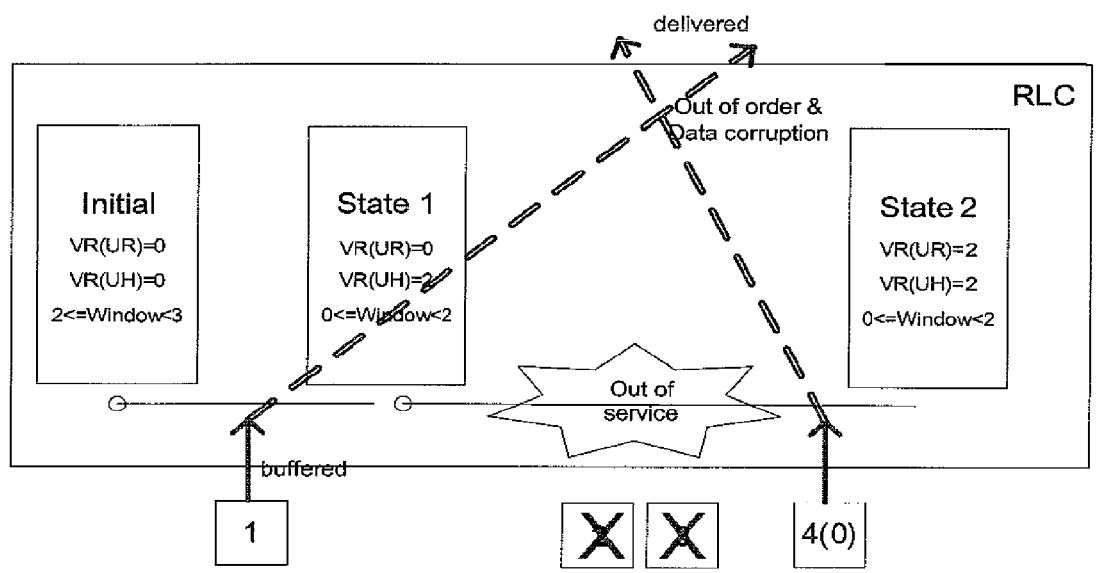
FIG. 7 is another exemplary view illustrating a process of data blocks during the reception of the point-to-multipoint service.

FIG. 7 is another exemplary view illustrating a process of data blocks during the reception of the point-to-multipoint service.

In FIG. 7, it is assumed that a value of T-Reordering timer is set to be very large value.

As shown in the FIG. 7, an initial state of RLC UM entity is set to VR(UR)=VR(UH)=0, and a receiving window is set to 0<=SN<3. If the RLC PDU having SN=1 is received, the state variable of the VR(UR) and VR(UH) are updated to have value of 2. (VR(UR)=VR(UH)=2) The RLC SDUs included in the RLC PDU are processed, and those RLC SDUs are delivered to an upper layer. Then, the receiving window is updated to be set as 0<=SN<2. Thereafter, the terminal goes temporarily through an interruption such as an out of service area. During this time, the terminal misses the RLC PDUs having SN=2,3. Then, the terminal comes out of interruptions (i.e., the out of service area), and the reception of the RLC PDUs becomes possible. Here, the terminal receives the RLC PDU having SN=0. Since the RLC PDU having SN=0 falls into within the receiving window and the SN is less than the VR(UR), the RLC PDU having SN=0 may also be delivered to the upper layer. Here, the RLC PDU having SN=0 may be a new RLC PDU (i.e., not related to the RLC PDUs transmitted previously). In this case, the RLC PDU data corruption is happened, as the receiving side still regards this RLC PDU having SN=0 with the previously transmitted RLC PDUs. Therefore, there is a possibility that a newly received RLC PDU can be mistakenly regarded as a previously transmitted RLC PDU.

As aforementioned, the object of the present invention is to provide an improved method of receiving a point-to-multipoint service data in a wireless communication system in order to minimize a data lose by a receiving entity.

Figure 8:
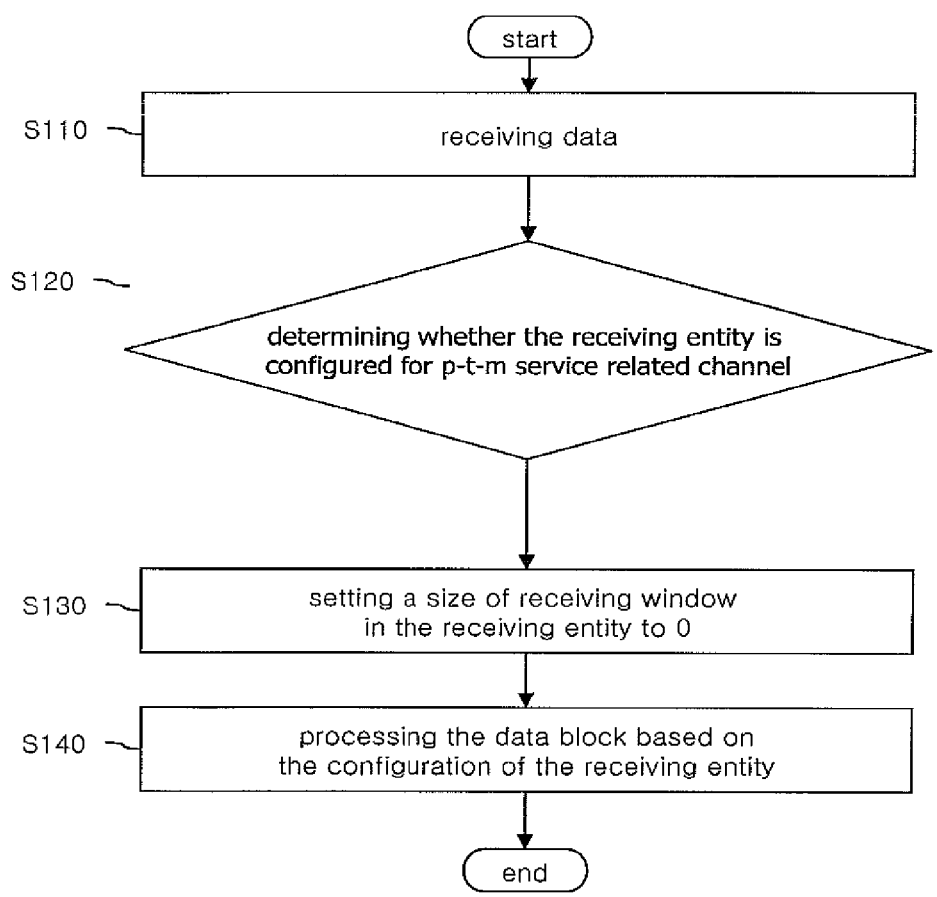
FIG. 8 is an exemplary flow chart illustrating a technical concept of the present invention.

FIG. 8 is an exemplary flow chart illustrating a technical concept of the present invention.

As shown in FIG. 8, the terminal receives data block(s) from a lower layer. (S110) Here, the data block(s) may be a RLC PDU(s). Thereafter, it is determined that whether the receiving entity is configured for a point-to-multipoint service related channel. (S120). Here, the point-to-multipoint service may be a multimedia broadcast/multicast service (MBMS), and the channel(s) related with the point-to-multipoint service may be a MBMS control channel (MCCH) or a MBMS traffic channel (MTCH). If it is determined that the receiving entity is configured for the point-to-multipoint service related channel, a size of the receiving window in the receiving entity is set to 0. (S130) Namely, a state variable for the receiving window (i.e., UM_Window-Size) may be set to 0. Here, a RLC entity configured for the MBMS may be refer to a RLC entity mapping into the MTCH or MCCH channel. Upon setting the state variable for the receiving window to 0, all received RLC UM PDUs should be outside of the receiving window, as such those received RLC UM PDUs are always regarded as new RLC UM PDUs. Here, such state variable for the receiving window is set by an indication from a upper layer such as a radio resource control (RRC) layer. If it is determined that the receiving entity is not configured for the point-to-multipoint service related channel, the state variable for the receiving window (e.g, UM_Window_Size) is set based on a size of SN. Lastly, the RLC entity may process the data block, such as RLC PDUs, based on the configuration of the receiving entity. (S140) Namely, the RLC entity may remove a RLC header from the RLC PDUs, and may delivers RLC SDUs after performing the SDU reassembly.

Figure 9:
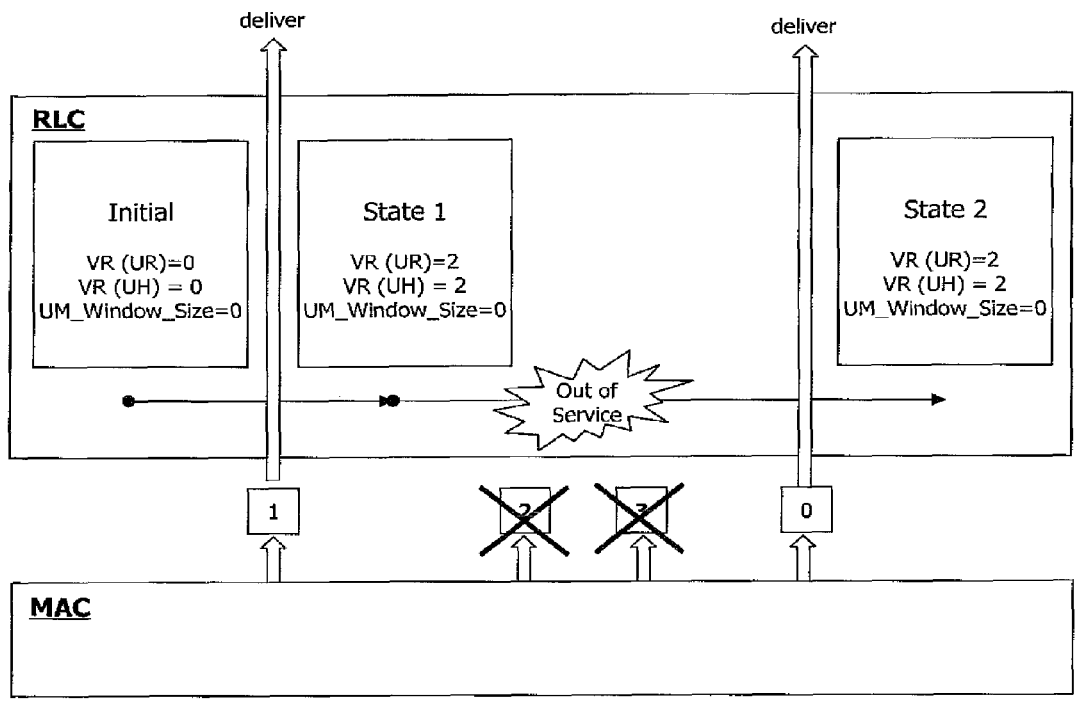
FIG. 9 is an exemplary view illustrating an improved method of process the data blocs during the reception of the point-to-multipoint service according to the present invention.

FIG. 9 is an exemplary view illustrating an improved method of process the data blocs during the reception of the point-to-multipoint service according to the present invention.

As shown in the FIG. 9, an initial state of RLC UM entity is set to VR(UR)=VR(UH)=0, and a receiving window is set to 0, as the RLC UM entity is configured for point-to-multipoint service such as the MCCH or MTCH. If the RLC PDU having SN=1 is received in state 1, the state variable of the VR(UR) and VR(UH) are updated to have value of 2. (VR(UR)=VR(UH)=2) Since the RLC PDU having SN=1 is outside of the receiving window, the RLC SDUs included in the RLC PDU are processed (e.g., reassembled), and those RLC SDUs are delivered to an upper layer. Then, the receiving window is updated to be set as 0<=SN<2. Thereafter, the terminal goes temporarily through an interruption such as an out of service area. During this time, the terminal misses the RLC PDUs having SN=2,3. Then, the terminal comes out of interruptions (i.e., the out of service area), and the reception of the RLC PDUs becomes possible. Here, the terminal receives the RLC PDU having SN=0, and this RLC PDU is processed and delivered to the upper layer, since RLC PDU is also outside of the receiving window.

Further, other alternative methods according to the present invention may be proposed as following.

As a first alternative method, after the terminal comes out of an interruption, the terminal may reconfigured a RLC UM entity, which is configured for a MBMS channel such as a MTCH or MCCH. Here, the RLC UM entity is reconfigured by setting all state variables of the RLC UM entity into initial values. Namely, once the terminal comes out of the interruption, the terminal may regard any data block(s) carried in the MBMS channel as a new data block(s).

As a second alternative method, a flush timer may be used. That is, the flush timer may start or restart whenever the terminal receives a new RLC PDU. Then, all data block(s) stored in a RLC buffer are delivered to an upper layer when the flush timer expires. Also, the RLC UM entity is reconfigured after the expiration of the flush timer.

As a third alternative method, after a t-Reordering timer expires, if the terminal receives a RLC PDU for the first time, a state variable of VR(UH) is configured same as the received RLC PDU. Namely, the received RLC PDU is no longer discarded since the received RLC PDU is always outside of the receiving window.

As a fourth alternative method, after the terminal comes out of the interruption, if the terminal receives a RLC PDU for the first time, a state variable of VR(UH) is configured same as the received RLC PDU. Namely, the received RLC PDU is no longer discarded since the received RLC PDU is always outside of the receiving window.

As a fifth alternative method, with respect to for the RLC entity configured for the MBMS channel, any MAC PDU including data corresponding to the RLC entity may include a reordering indicator. Here, the reordering indicator may indicate whether the received RLC PDU is to be delivered to the upper layer immediately or the received RLC PDU is to be delivered to the upper layer after performing of a reordering.

As a sixth alternative method, the RLC UM entity may regard all received RLC PDU as new RLC PDU by an RRC indicator.

As a seventh alternative method, a specific constant is used for a UM_Window_Size. Namely, this constant is used by receiving UM RLC entity to defined SNs of those UMD PDU that can be received without causing an advancement of the receiving window. Specifically, the present invention proposes to configure the UM_Window_Size to 0 when the receiving UM RLC entity is configured for the MCCH or MTCH.

The present invention may provide a method for configuring a receiving entity for a reception of a data block, the method comprising: determining whether the receiving entity is configured for a channel related to a point-to-multipoint service; setting a size of receiving window in the receiving entity to zero if it is determined that the receiving entity is configured for the point-to-multipoint service related channel; and processing the data block having sequence number according to the configuration of the receiving entity, wherein the receiving entity is a receiving Unacknowledged Mode (UM) RLC entity, the point-to-multipoint service related channel is either a MCCH or MTCH, the point-to-multipoint service is a MBMS service, the data block is a UMD PDU (MAC SDU), if the receiving entity is not configured for the point-to-multipoint service related channel, the size of receiving window in the receiving entity is set based on a bit size of the received data block, if the receiving entity is not configured for the point-to-multipoint service related channel, the size of receiving window in the receiving entity is set to define the sequence number of received data block that can be received without causing an advancement of the receiving window.

Also, it can be said that the present invention may provide a terminal for receiving a data block in wireless communication system, the terminal comprising: a transceiver adapted to receive the data block; and a processor adapted to control the transceiver, wherein the processor performs steps of, determining whether a receiving entity is configured for a channel related to a point-to-multipoint service; setting a size of receiving window in the receiving entity to zero if it is determined that the receiving entity is configured for the point-to-multipoint service related channel; and processing the data block having sequence number according to the configuration of the receiving entity, wherein the receiving entity is a receiving Unacknowledged Mode (UM) RLC entity, the point-to-multipoint service related channel is either a MCCH or MTCH, the point-to-multipoint service is a MBMS service, the data block is a UMD PDU (MAC SDU), if the receiving entity is not configured for the point-to-multipoint service related channel, the size of receiving window in the receiving entity is set based on a bit size of the received data block, if the receiving entity is not configured for the point-to-multipoint service related channel, the size of receiving window in the receiving entity is set to define the sequence number of received data block that can be received without causing an advancement of the receiving window.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for configuring a receiving entity for a reception of a data block, the method comprising:
   determining whether a receiving Unacknowledged Mode (UM) Radio Link Control (RLC) entity processing an UM Data Protocol Data Unit (UMD PDU) is configured for a channel related to a point-to-multipoint service;
   setting a size of a receiving window in the receiving UM RLC entity, wherein the size of receiving window is set to zero only when it is determined that the receiving UM RLC entity is configured for the point-to-multipoint service related channel, wherein the size of receiving window is set to a pre-defined value when it is determined that the receiving UM RLC entity is not configured for the point-to-multipoint service related channel, wherein the pre-defined value is set based on a size of a sequence number (SN) of the UMD PDU; and
   processing the UMD PDU according to the size of the receiving window in the receiving UM RLC entity.

2. The method of claim 1, wherein the size of the receiving window is set to 16 when the size of sequence number (SN) of the UMD PDU is set to 5-bit.

3. The method of claim 1, wherein the size of the receiving window is set to 512 when the size of sequence number (SN) of the UMD PDU is set to 10-bit.

4. The method of claim 1, wherein the size of the sequence number (SN) of the UMD PDU is indicated by a Radio Resource Control (RRC) message.

5. The method of claim 1, wherein the point-to-multipoint service related channel is either a Multicast Control Channel (MCCH) or Multicast Traffic Channel (MTCH).

6. The method of claim 1, wherein the point-to-multipoint service is a Multimedia Broadcast/Multicast Service (MBMS).

7. The method of claim 1, wherein the receiving entity is a mobile terminal.

8. A terminal for receiving a data block in wireless communication system, the terminal comprising:
   a transceiver adapted to receive an Unacknowledged Mode Data Protocol Data Unit (UMD PDU); and
   a processor adapted to control the transceiver,
   wherein the processor is further adapted to,
   determine whether a receiving Unacknowledged Mode (UM) Radio Link Control (RLC) entity processing the UMD PDU is configured for a channel related to a point-to-multipoint service;
   set a size of a receiving window in the receiving UM RLC entity, wherein the size of receiving window is set to zero only when it is determined that the receiving UM RLC entity is configured for the point-to-multipoint service related channel, wherein the size of receiving window is set to a pre-defined value when it is determined that the receiving UM RLC entity is not configured for the point-to-multipoint service related channel, wherein the pre-defined value is set based on a size of a sequence number (SN) of the UMD PDU; and
   process the UMD PDU according to the size of the receiving window in the receiving UM RLC entity.

9. The terminal of claim 8, wherein the size of the receiving window is set to 16 when the size of sequence number (SN) of the UMD PDU is set to 5-bit.

10. The terminal of claim 8, wherein the size of the receiving window is set to 512 when the size of sequence number (SN) of the UMD PDU is set to 10-bit.

11. The terminal of claim 8, wherein the size of the sequence number (SN) of the UMD PDU is indicated by a Radio Resource Control (RRC) message.

12. The terminal of claim 8, wherein the point-to-multipoint service related channel is either a Multicast Control Channel (MCCH) or Multicast Traffic Channel (MTCH).

13. The terminal of claim 8, wherein the point-to-multipoint service is a Multimedia Broadcast/Multicast Service (MBMS).

* * * * *